United States Patent Office 3,560,558
Patented Feb. 2, 1971

3,560,558
HEXAHYDROINDANE DICARBOXYLIC
ACID DERIVATIVES
Shohei Hayakawa, Hyogo, Yoshiko Kanematsu, Kyoto-shi, and Takashi Fujiwara, Hyogo, Japan, assignors to Shionogi & Co., Ltd., Osaka, Japan
No Drawing. Continuation-in-part of application Ser. No. 478,735, Aug. 10, 1965. This application Oct. 29, 1968, Ser. No. 771,994
Int. Cl. C07c 61/36
U.S. Cl. 260—514                                    10 Claims

ABSTRACT OF THE DISCLOSURE $4\alpha$ - (2 - carboxyethyl)-5-oxo-($1\alpha$-hydrogen- or $1\alpha$-hydroxyl) - $7a\beta$ - methyl - $3a\alpha$-hexahydroindane-carboxylic acids or lower alkanoic acids, which can be prepared by one-step fermentative degradation of the bile acids or their homologues, are useful as cholesterol lowering agents.

---

This application is a continuation-in-part application of copending patent application Ser. No. 478,735, filed Aug. 10, 1965 now abandoned.

This invention relates to novel hexahydroindane dicarboxylic acid derivative. More particularly, it relates to novel useful compounds represented by the general formula:

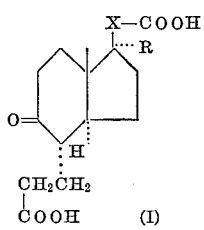

wherein X means absence or presence of a grouping selected from $-CH_2-$, $-CH(CH_3)-$ and $$-(CH(CH_3))-(CH_2)_n-$$

in which $n$ is an integer from 1 to 4 inclusive; and R is a hydrogen atom or hydroxyl group. Compounds I are useful as cholesterol metabolism controlling agents for treatment of hypercholesterolemia in human and other warm-blooded animals.

The object of the present invention is to provide novel useful compounds. Another object is to provide novel cholesterol metabolism controlling agents having no significant side effects.

Compounds I can be prepared by a process which comprises cultivation of *Corynebacterium* (Arthrobacter) *simplex* in a culture medium containing one or more following steroidal substances of the formula:

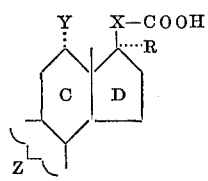

wherein X and R have the same significances as defined above; Y means a hydrogen atom or hydroxyl group; and Z is selected from the group consisting of:

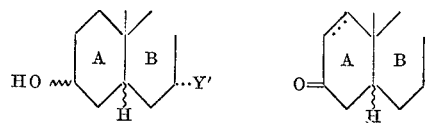

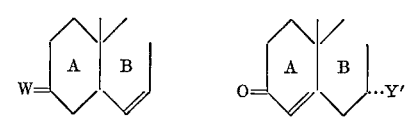

and

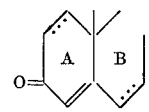

wherein Y' is a hydrogen atom or hydroxyl group; W is an $\alpha$ or $\beta$-hydroxyl group or oxo group; and the broken line represents the absence or presence of a double bond, as main carbon sources.

Among the starting compounds which fall in the above designation, the following are smoothly consumed and converted by the Corynebacterium according to the herein-described process:

$3\alpha,7\alpha,12\alpha$-trihydroxy-$5\beta$-androstane-$17\beta$-carboxylic acid,
3-oxo-$5\beta$-androstane-$17\beta$-carboxylic acid,
3-oxo-androst-4-ene-$17\beta$-carboxylic acid,
$3\alpha$-hydroxyandrost-5-ene-$17\beta$-carboxylic acid,
3-oxo-androsta-1,4-diene-$17\beta$-carboxylic acid,
3-oxo-$17\alpha$-hydroxy-$5\beta$-androstane-$17\beta$-carboxylic acid,
3-oxo-$17\alpha$-hydroxy-$5\alpha$-androstane-$17\beta$-carboxylic acid,
3-oxo-$17\alpha$-hydroxyandrost-4-ene-$17\beta$-carboxylic acid,
3-oxo-$17\alpha$-hydroxyandrosta-1,4-diene-$17\beta$-carboxylic acid,
$3\alpha,17\alpha$-dihydroxyandrostane-$17\beta$-carboxylic acid,
$3\beta,17\alpha$-dihydroxyandrostane-$17\beta$-carboxylic acid,
$3\beta,17\alpha$-dihydroxyandrost-5-ene-$17\beta$-carboxylic acid,
3-oxo-23-nor-$5\beta$-cholan-22-oic-acid,
3-oxo-23-norchol-4-en-22-oic acid,
$3\beta$-hydroxy-23-norchol-5-en-22-oic acid,
3-oxo-23-norchola-1,4-dien-22-oic acid,
3-oxo-23-norchol-5-en-22-oic acid,
3-oxo-$17\alpha$-hydroxy-23-norchol-4-en-22-oic acid,
3-oxo-$17\alpha$-hydroxy-23-norchol-5-en-22-oic acid,
$3\beta$-hydroxy-$17\alpha$-hydroxy-23-norchol-5-en-22-oic acid,
3-oxo-$17\alpha$-hydroxy-23-norchol-5-en-22-oic acid,
3-oxo-$17\alpha$-hydroxy-23-norchol-5-en-22-oic acid,
lithoxholic acid,
deoxycholic acid,
cholic acid,
3-oxo-chol-4-enic acid,
$3\beta$-hydroxychol-5-enic acid,
3-oxo-$7\alpha,12\alpha$-dihydroxy-chol-4-enic acid,
3-oxo-chola-1,4-dienic acid,
3-oxo-$12\alpha$-hydroxychola-4,6-dienic acid,
3-oxo-$17\alpha$-hydroxychol-4-enic acid,
$3\beta,17\alpha$-dihydroxychol-5-enic acid,
3-oxo-$7\alpha,12\alpha,17\alpha$-trihydroxychol-4-enic acid,
3-oxo-$17\alpha$-hydroxychola-1,4-dienic acid,
3-oxo-$12\alpha$-hydroxychola-4,6-dienic acid,
$17\alpha$-hydroxy-lithocholic acid.

Other compounds which also fall in the same designation are not smoothly consumed and converted solely in the reaction. However, such compounds can also be utilized when the enzyme system in the used microbe is previously or simultaneously adapted or induced by contact with the above-mentioned easily utilizable substrates. For such procedure, the following compounds may be illustrated as the starting materials:

3α-hydroxy-5β-androstane-17β-carboxylic acid,
3α,12α-dihydroxy-5β-androstane-17β-carboxylic acid,
3α,7α-dihydroxy-5β-androstane-17β-carboxylic acid,
3-oxo-5α-androstane17β-carboxylic acid,
3β-hydroxyandrost-5-ene-17β-carboxylic acid,
3-oxo-12α-hydroxyandrosta-4,6-diene-17β-carboxylic acid,
3α-hydroxy-5β-pregnan-21-oic acid,
3-oxo-5α-pregnan-21-oic acid,
3-oxopregn-4-en-21-oic-acid,
3β-hydroxypregn-5-en-21-oic acid,
3-oxopregna-1,4-dien-21-oic acid,
3α,12α-dihydroxy-23-nor-5β-cholan-22-oic acid,
3α,7α-dihydroxy-23-nor-5β-cholan-22-oic acid,
3α,7α,12α-trihydroxy-23-nor-5β-cholan-22-oic acid,
3-oxo-12α-hydroxy-23-nor-5β-cholan-22-oic acid,
3-oxo-23-nor-5α-cholan-22-oic acid,
3α,12α-dihydroxy-24-nor-5β-cholan-23-oic acid,
3α,7α,12α-trihydroxy-24-nor-5β-cholan-23-oic acid,
3-oxo-24-nor-5α-cholan-23-oic acid,
3-oxo-24-norchol-4-en-23-oic acid,
3β-hydroxy-24-norchol-5-en-23-oic acid,
3-oxochola-1,4-dien-24-oic acid,
chenodeoxycholic acid,
3-oxo-5β-cholanic acid,
3-oxo-12α-hydroxy-5β-cholanic acid,
3-oxo-5α-cholanic acid,
3-oxo-12α-hydroxy-5α-cholanic acid,
3-oxo-5β-chol-1-enic acid,
3-oxo-12α-hydroxy-5β-chol-1-enic acid,
3-oxo-5α-chol-1-enic acid,
3-oxo-12α-hydroxycho-4-enic acid,
3α-hydroxychol-5-enic acid,
3α,12α-dihydroxychol-5-enic acid,
3β,12α-dihydroxy-chol-5-enic acid,
3-oxo-12α-hydroxychola-1,4-dienic acid,
3α,7α,12α-trihydroxy-5β-cholane-24-carboxylic acid,
3-oxo-5β-cholane-24-carboxylic acid,
3-oxochol-4-ene-24-carboxylic acid,
3β-hydroxychol-5-ene-24-carboxylic acid,
3α-hydroxy-27-nor-5β-cholestan-26-oic acid,
3α,7α,12α-trihydroxy-27-nor-5β-cholestan-26-oic acid,
3-oxo-27-nor-5β-cholestan-26-oic acid,
3-oxo-27-norcholest-5-en-26-oic acid,
3α-hydroxy-5β-cholestan-26-oic acid,
3α,12α-dihydroxy-5β-cholestan-26-oic acid,
3α,7α-dihydroxy-5β-cholestan-26-oic acid,
3α,7α,12α-trihydroxy-5β-cholestan-26-oic acid,
3-oxo-5α-cholestan-26-oic acid,
3β-hydroxy-cholest-5-en-26-oic acid,
3β,17α-dihydroxy-23-norchol-5-en-22-oic acid,
3-oxo-17α-hydroxy-chol-4-ene-24-carboxylic acid,
3-oxo-17α-hydroxy-5β-cholane-24-carboxylic acid, They are used in the reaction not only in the free acid form but also in the corresponding water-soluble salt form such as sodium salt or potassium salt. The conjugated compounds such as glyco- and tauro-cholic acid, -deoxycholic acid, -lithocholic acid, etc. or a mixture thereof, especially crude preparations of ox bile extract, etc., can also be used effectively.

The reaction can be carried out by the conventional aerobic cultivation method except for using *Corynebacterium simplex* and the above-mentioned steroidal substances solely or in combination as the carbon source. However, in many cases, the addition of conventional carbon sources such as glucose decreases the yield of the products. The reaction can be carried out at a temperature between about 25 and about 35° C., a pH between about 6.5 and about 8.0, with agitation and aeration. The culture medium should contain nitrogen source such as peptone, urea, ammonium sulfate or the like, and several inorganic salts found generally to be effective to promote the growth of microorganisms. Maximum yield of the products is generally realized in from about 1 to 5 days. The optimal reaction period can be preferably determined by checking with chromatographic techniques, especially with thin-layer chromatography. The yield of the product and optimal reaction period varies with kind of starting compound used or method of induction or adaptation. It is generally noted that lower molecular weight starting compounds require shorter reaction periods and afford higher yields.

Specific examples of products thereby obtained are:

1β-carboxy-5-oxo-7aβ-methyl-3aα-hexahydroindane-4α-propionic acid,
1β-carboxy-1α-hydroxy-5-oxo-7aβ-methyl-3aα-hexahydroindane-4α-propionic acid,
1β-carboxymethyl-5-oxo-7aβ-methyl-3aα-hexahydroindane-4α-propionic acid,
1β-carboxy-methyl-1α-hydroxy-5-oxo-7aβ-methyl-3aα-hexahydroindane-4α-propionic acid,
1β-(1-carboxyethyl)-5-oxo-7aβ-methyl-3aα-hexahydroindane-4α-propionic acid,
1β-(1-carboxyethyl)-1α-hydroxy-5-oxo-7aβ-methyl-3aα-hexahydroindane-4α-propionic acid,
4α-(2-carboxyethyl)-5-oxo-7aβ,β-dimethyl-3aα-hexahydroindane-1β-propionic acid,
4α-(2-carboxyethyl)-1α-hydroxy-5-oxo-7aβ,β-dimethyl-3aα-hexahydroindane-1β-propionic acid,
4α-(2-carboxyethyl)-5-oxo-7aβ,γ-dimethyl-3aα-hexahydroindane-1β-butyric acid,
4α-(2-carboxyethyl)-1α-hydroxy-5-oxo-7aβ,γ-dimethyl-3aα-hexahydroindane-1β-butyric acid,
4α-(2-carboxyethyl)-5-oxo-7aβ,δ-dimethyl-3aα-hexahydroindane-1β-valeric acid,
4α-(2-carboxyethyl)-1α-hydroxy-5-oxo-7aβ,δ-dimethyl-3aα-hexahydroindane-1β-valeric acid,
4α-(2-carboxyethyl)-5-oxo-7aβ,ε-dimethyl-3aα-hexahydroindane-1β-caproic acid,
4α-(2-carboxyethyl)-1α-hydroxy-5-oxo-7aβ,ε-dimethyl-3aα-hexahydroindane-1β-caproic acid,
4α-(2-carboxyethyl)-5-oxo-7aβ,α,ε-trimethyl-3aα-hexahydroindane-1β-caproic acid and their alkali metal salts.

It is to be noted that during the coarse of the reaction, the hydroxy group of alkanolyoxy group located at position 7 or 12 of the starting steroid compound disappears to give the corresponding 7- and 2'-methylene group of the 4-(2-carboxyethyl)-hexahydroindane skeleton.

The aforesaid products decrease plasma total cholesterol and phospholipid levels, and increase plasma total cholesterol/plasma phospholipid level ratio. For example, 4α-(2-carboxyethyl) - 5 - oxo-7aβ,γ-dimethyl-3aα-hexahydroindane - 1β - butyric acid decreases plasma total cholesterol level —10.7% and phospholipid level —17.9%, and increases C/P ratio 7.9% in rats upon oral administration or subcutaneous injection, 1 mg.×10 days, and 1β-(1-carboxyethyl)-5 - oxo - 7aβ - methyl-3aα-hexahydroindane-4α-propionic acid decreases plasma total cholesterol level —8.0% and phospholipid level —7.5% and increases C/P ratio 3% in rats on oral administration or subcutaneous injection, 5 mg.×10 days. They can be administered to man or warm-blooded animals suffering from hypercholesterolemia or hypertension in the form of conventional preparations such as injections, tablets, powders, pills, granules, liquids, etc. A suitable daily dose is 0.1–100 mg./day per kg. of body weight.

The following examples serve to illustrate practical embodiments of the present invention, but they are not intended to limit the scope of the invention. Percentages are by weight.

EXAMPLE 1

A culture medium (1.1 liters) of the following constitution:

| | Percent |
|---|---|
| Ammonium sulfate | 0.2 |
| Potassium dihydrogen phosphate | 0.1 |
| Magnesium sulfate (heptahydrate) | 0.05 |
| Potassium chloride | 0.05 |
| Ferrous sulfate (heptahydrate) | 0.01 |
| Yeast extract | 0.05 |
| Sodium cholate | 0.1 | is adjusted to pH 7.15 by addition of 10%-aqueous sodium hydroxide solution and divided into 100 portions, which are severally placed in 500 ml. Sakaguchi's shaking bottles. After sterilization, the bottles are inoculated with *Corynebacterium simplex* (IFO 3530 or ATCC 6967 strain) and thereafter cultivated at 28° C. under shaking. After completion of the cultivation (about 4–5 days), the culture broth is adjusted to pH 4.0 by addition of 10%-aqueous hydrochloric acid solution and extracted with ether or ethyl acetate. The extract is washed with water, dried with anhydrous sodium sulfate and distilled to remove solvent. The crystalline residue (235 mg.) affords prismatic 4α-(2-carboxyethyl)-5-oxo-7aβ,γ-dimethyl-3aα-hexahydroindane-1β-butyric acid (M.P. 169.5–170° C., yield: about 20–30%). $[\alpha]_D^{24} = +20.5 \pm 5°$ (c.=0.45, in ethanol).

IR: $\nu_{max}^{Nujol}$ 3150–2700, 1703 cm.$^{-1}$

UV: no characteristic absorption band.

*Analysis.*—Calcd. for $C_{18}H_{28}O_5$ (percent): C, 66.64; H, 8.70. Found (percent): C, 66.71; H, 8.70.

EXAMPLE 2

Repitition of the treatment according to Example 1, except for utilization of ox bile extract (oxgall) in 0.1–0.2% concentration instead of 0.1% of sodium cholate, in the same culture medium, affords the same product in a yield of about 20%.

EXAMPLE 3

Repetition of the treatment according to Example 1, except for replacement of sodium cholate by an equal amount of sodium lithocholate in the same culture medium, affords the same product in a yield of about 20%.

EXAMPLE 4

Repetition of the treatment according to Example 1, except for replacement of sodium cholate by 0.1% of an equimolar mixture of sodium cholate and sodium chenodeoxycholate in the said cultivation medium, affords the same product in an about 20%-yield.

EXAMPLE 5

Repetition of the treatment according to Example 1, except for replacement of sodium cholate by 0.1% of an equimolar mixture of sodium cholate and sodium deoxycholate in the same cultivation medium, affords same product in an about 20%-yield.

EXAMPLE 6

Essentially the same result is obtained by replacement of the culture medium in Example 1 by the following (pH 7.15–7.4):

| | Percent |
|---|---|
| Ammonium sulfate | 0.2 |
| Dipotassium hydrogen phosphate | 0.1 |
| Magnesium sulfate (heptahydrate) | 0.05 |
| Ferric chloride (hexahydrate) | 0.001 |
| Sodium cholate | 0.1 |

EXAMPLE 7

The addition of 0.05% of yeast extract to the culture medium in Example 6 gives the same result.

EXAMPLE 8

A culture medium (50 liters) of the same constitution as in Example 1, except for replacement of pure sodium cholate by 50 grams of crude crystalline cholic acid (prepared from ox bile extract, containing around 20% of desoxycholic acid), is inoculated with bouillon liquor (500 ml.) precultured with *Corynebacterium simplex* at 28° C. for 24 hours and aerobically cultured at 28° C. for 48 hours under reciprocal shaking at 375 r.p.m. The culture broth is adjusted to pH 2.0 and extracted with ethyl acetate. The extract is counter extracted with dilute aqueous sodium hydrogen carbonate solution. The alkaline aqueous extract is acidified with hydrochloric acid and then extracted with chloroform. The chloroform layer affords on evaporation the crude product, which is treated with acetone and gives 4α-(2-carboxyethyl)-5-oxo-7aβ,γ-dimethyl-3aα-hexahydroindane-1β-butyric acid in about 30%-yield.

The substance is dissolved in ethanol, added to an equimolar amount of sodium hydroxide and the mixture is concentrated, whereby the corresponding disodium salt (M.P.>300° C.) obtained. It is soluble in water and reverts to the free acid form by the action of acid. By similar treatment, the corresponding dipotassium salt (M.P.>300° C.) is obtained.

EXAMPLE 9

The same treatment as in the Example 1 with the culture medium of the same constitution as in Example 1 except for replacement of sodium cholate by an equal amount of sodium 3-oxo-androst-4-ene-17β-carboxylate affords crude product in around 80%-yield. By recrystallization from acetone, it is purified and affords 1β-carboxy-5-oxo-7aβ-methyl-3aα-hexahydroindane-4α-propionic acid (M.P. 236.5–240.5° C.). $[\alpha]_D^{25} = +34.5 \pm 2°$ (c.=1.064, chloroform).

IR: $\nu_{max}^{Nujol}$ 3100–2600, 1694 cm.$^{-1}$

UV: no characteristic absorption band.

*Analysis.*—Calcd. for $C_{14}H_{20}O_5$ (percent): C, 62.67; H, 7.51. Found (percent): C, 62.50; H, 7.50.

EXAMPLE 10

*Corynebacterium simplex* (IFO 3530 strain) is precultured at 28° C. for 48 hours in a medium (1 liter) consisting of 0.5% glucose, 0.5% polypeptone, 0.5% corn steep liquor and 0.1% sodium 3-oxo-androst-4-ene-17β-carboxylate to make inoculant. A culture medium prepared in the same manner as in Example 1 by using 16.5 g. of sodium 3-oxo-androst-4-ene-17β-carboxylate instead of sodium cholate is placed in a 30-liter jar fermenter, inoculated with the inoculant prepared above and then cultured at 30° C. for 114 hours under reciprocal shaking at 250–350 r.p.m., internal pressure 0.5 kg./cm.$^2$ and aeration rate 17 liters/min. The culture broth is adjusted to pH around 2 and extracted with ethyl acetate. The extract is washed with water and distilled to remove the solvent. The distillation residue is triturated with ether to give crude crystalline product (12.4 g.), which affords 9.06 g. of pure crystals of 1β-carboxy-5-oxo-7aβ-methyl-3aα-hexahydroindane-4α-propionic acid by recrystallization from methanol.

EXAMPLE 11

The same procedure as Example 1 with replacement of the raw material sodium cholate by an equal amount of sodium 3β-hydroxy-23-norchol-5-en-22-oate affords crude 1β-(1-carboxyethyl)-5-oxo-7aβ-methyl-3aα-hexahydroindane-4α-propionic acid in a yield of about 40%. On recrystallization from acetone-petroleum ether mixture, it gives pure crystals of M.P. 158.5–159.5° C. $[\alpha]_D = +0.7 \pm 0.25°$ (c.=3.620, chloroform), IR: $\nu_{max.}^{Nujol}$ 3200–2800, 1745, 1710, 1680 cm.$^{-1}$ UV: no characteristic absorption.

*Analysis.*—Calcd. for $C_{16}H_{24}O_5$ (percent): C, 64.84; H, 8.16. Found (percent): C, 64.89; H, 8.13.

EXAMPLE 12

Inoculant is prepared by cultivation of 300 ml. of medium of the same constitution as in Example 10 except for replacement of the sodium 3-oxo-androst-4-ene-17β-carboxylate by sodium 3β-hydroxy-23-norchol-5-en-22-oate, at 28° C. for 72 hours. Culture media (2× 20 liters) prepared in the same manner as in Example 10 by using sodium 3β-hydroxy-bis-norchol-5-enate (2× 20 g.) instead of sodium 3-oxo-androst-4-ene-17β-carboxylate are placed in jar fermenters (2× 30 liters), inoculated with the above inoculant and thereafter cultivated aerobically (aeration rate, 20 liters/min.) at 29–32° C. for 45 hours under internal pressure of 0.5 kg./cm.² at 250 r.p.m. The culture broth is adjusted to pH about 2 and extracted with ethyl acetate. The extract is washed with water and distilled to remove solvent. The distillation residue is treated with ether and recovered 16.4 g. of crude product, which affords crystalline pure product 1β-(1-carboxyethyl) - 5 - oxo-7aβ-methyl-3aα-hexahydroindane-4α-propionic acid (8.61 g.).

EXAMPLE 13

According to the procedure described in Example 12, 60 g. of cholic acid (instead of 3β-hydroxy-23-norchol-5-en-22-oic acid) is cultivated in 3× 30 liter-jar fermenters and treated, whereby 32.3 g. of crude product 4α-(2-carboxyethyl)-5-oxo-7aβ,γ - dimethyl - 3aα-hexahydroindane-1β-butyric acid is obtained.

The same treatment with 3β-hydroxychol-5-enic acid affords the same product.

EXAMPLE 14

According to the procedure described in the above Example 12, but using a mixture consisting of sodium cholate and a compound selected from sodium 3-oxo-pregn-4-en-21-oate, sodium 24 - norcholate, sodium 3β-hydroxy-27-nor-5β-cholestan-26-oate and sodium 3-oxo-5α-cholestan-25-oate instead of sodium 3β-hydroxy-23-norchol-5-en-22-oate, the respective products, 1β-carboxymethyl-5-oxo-7aβ-methyl-3aα-hexahydroindane-4α-propionic acid,
4α-(2-carboxyethyl)-5-oxo-7aβ,β-dimethyl-3aα-hexahydroindane-1β-propionic acid,
4α-(2-carboxyethyl)-5-oxo-7aβ,δ-dimethyl-3aα-hexahydroindane-1β-valeric acid,
4α-(2-carboxyethyl)-5-oxo-7aβ,ε-dimethyl-3aα-hexahydroindane-1β-caproic acid and
4α-(2-carboxyethyl)-5-oxo-7aβ,α,ε-trimethyl-3aα-hexahydroindane-1β-caproic acid are obtainable as crystalline products.

EXAMPLE 15

Inoculant (700 ml. ×4) is prepared from an aqueous solution containing 0.5% glucose, 0.5% polypeptone, 0.5% corn steep liquor, 0.1% sodium 17α-hydroxy-3-oxo-androst - 4 - ene-17β-carboxylate by seeding *Corynebacterium* (Arthrobacter) *simplex,* followed by cultivation at 28° C. for 48 hours. Four jar-fermenters containing a total of 73 liters of culture medium containing the following:

| | Percent |
|---|---|
| Ammonium sulfate | 0.2 |
| Potassium dihydrogen phosphate | 0.1 |
| Magnesium sulfate (heptahydrate) | 0.05 |
| Potassium chloride | 0.05 |
| Ferrous sulfate (heptahydrate) | 0.01 |
| Yeast extract | 0.05 |
| Sodium 17α-hydroxy - 3 - oxo-androst-4-ene-17β-carboxylate | 0.1 | is sterilized by heating at 120° C. for 20 minutes and adjusted with aqueous sodium hydroxide to pH 7.2. The inoculant prepared above is added into each fermenter. Cultivation is carried out under reciprocal shaking 300 r.p.m., internal pressure 0.5 kg./cm.², aeration rate 23 liters/min., for 42 hours at 29° C. (the formation of the product is traced by thin-layer chromatograms of a part of the culture broth). The culture broth is concentrated to one-eighth of the original volume under reduced pressure, aqueous hydrochloric acid added to adjust the pH to 2.0 and extracted with ethyl acetate. The organic layer is washed with water, dried and concentrated. The separated crystals are collected by filtration, and ether is added to the mother liquor and the separated crystals are collected by filtration and combined with the crystals obtained above. Forty-four grams of crude crystals are recrystallized from acetone-ether to give 43.1 grams of 1β-carboxy-1α-hydroxy - 5 - oxo-7aβ-methyl-3aα-hexahydroindane-4α-propionic acid, M.P. 151–153° C. Yield 66.3% of pure product. Analytical sample melts at 153–154° C. $[\alpha]_D^{23} = -2.6 \pm 0.4°$ (c.=0.962, ethanol).

IR: $\nu_{max.}^{Nujol}$ 3494, 3450, broad peak at around 2666, 1698 cm.$^{-1}$

*Analysis.*—Calcd. for $C_{14}H_{20}O_6$ (percent): C, 59.14; H, 7.09. Found (percent): C, 59.37; H, 7.15.

EXAMPLE 16

According to the procedure described in the above Example 1, but using sodium 3-oxo-17α-hydroxypregn-4-ene-20-carboxylate instead of sodium cholate, there is obtained 4α-(2-carboxyethyl)-1α-hydroxy - 5 - oxo-7aβ,α-dimethyl-3aα-hexahydroindane-1β-acetic acid.

EXAMPLE 17

On treatment with aqueous sodium hydroxide solution or potassium hydroxide solution, the products obtained in the above Examples 1 to 16 yield the corresponding disodium salts or dipotassium salts, having the respective melting points higher than 300° C.

What is claimed is:
1. A member selected from the group consisting of compounds of the formula:

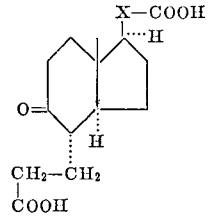

and the alkali metal salts thereof, wherein X means absence or presence of a grouping selected from the group consisting of —CH$_2$—, —CH(CH$_3$)— and —CH(CH$_3$)—(CH$_2$)$_n$— in which $n$ is an integer 1 to 4 inclusive.

2. A compound according to claim 1 namely, the compound of the formula:

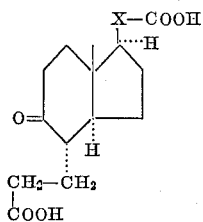

wherein X has the same significance as in claim 1.

3. A compound according to claim 1, namely 1β-carboxy - 5 - oxo - 7aβ - methyl - 3aα - hexahydroindane-4α-propionic acid.

4. A compound according to claim 1, namely, 1β-carboxy - methyl - 5 - oxo - 7aβ - methyl - 3aα - hexahydroindane-4α-propionic acid.

5. A compound according to claim 1, namely 1β-(1-carboxyethyl) - 5 - oxo - 7aβ - methyl - 3aα - hexahydroindane-4α-propionic acid.

6. A compound according to claim 1, namely 4α-(2-carboxyethyl) - 5 - oxo - 7aβ,β - dimethyl - 3aα - hexahydroindane-1β-propionic acid.

7. A compound according to claim 1, namely 4α-(2-carboxyethyl) - 5 - oxo - 7aβ,γ - dimethyl - 3aα-hexahydroindane-1β-butyric acid.

8. A compound according to claim 1, namely 4α-(2-carboxyethyl) - 5 - oxo - 7aβ,δ - dimethyl - 3aα - hexahydroindane-1β-valeric acid.

9. A compound according to claim 1, namely 4α-(2-carboxyethyl) - 5 - oxo - 7aβ,ε - dimethyl - 3aα - hexahydroindane-1β-caproic acid.

10. A compound according to claim 1, namely 4α-(2-carboxyethyl) - 5 - oxo - 7aβ,α,ε - trimethyl - 3aα - hexahydroindane-1β-caproic acid.

References Cited

Caspi et al.: J. Am. Chem. Soc. 86, 2463, 1964.

LORRAINE A. WEINBERGER, Primary Examiner

R. GERSTL, Assistant Examiner

U.S. Cl. X.R.

195—30; 260—397.1; 424—317